Dec. 7, 1948. H. SCHULZ 2,455,525
TRIPOD
Filed Sept. 14, 1945
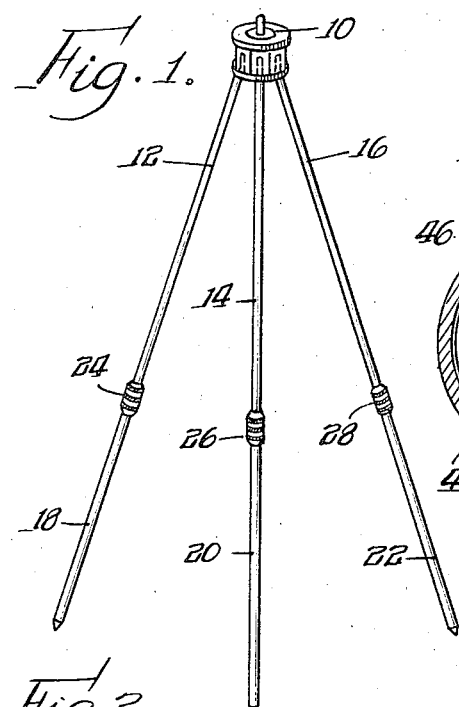
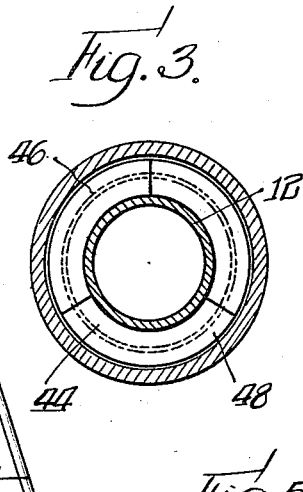
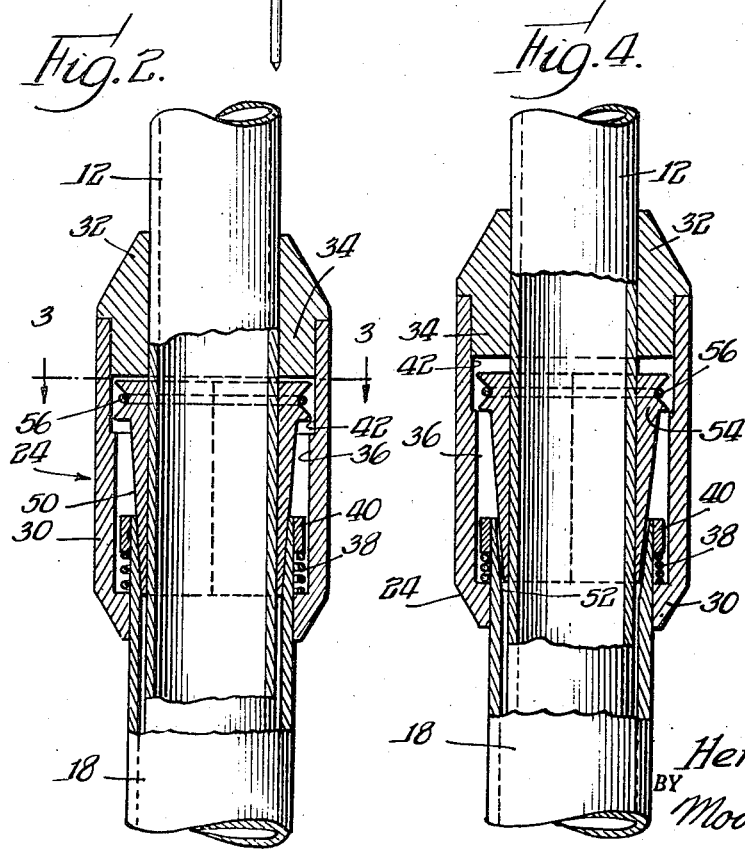
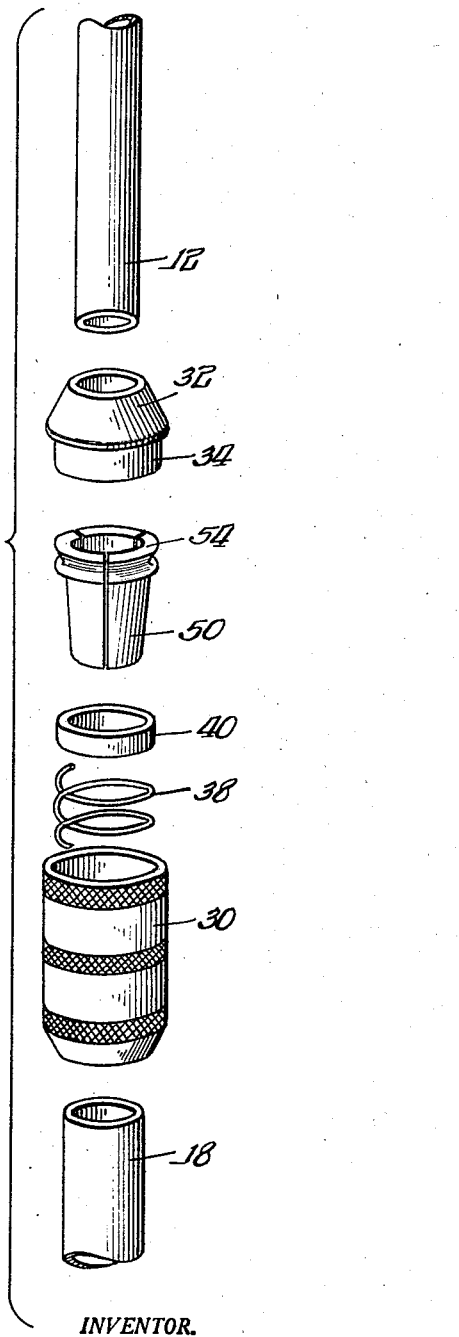
INVENTOR.
Herman Schulz
BY Moore, Olson & Trexler
Attys.

Patented Dec. 7, 1948

2,455,525

UNITED STATES PATENT OFFICE 2,455,525

TRIPOD

Herman Schulz, Chicago, Ill.

Application September 14, 1945, Serial No. 616,310

6 Claims. (Cl. 248—191)

The present invention relates to a connection for coaxial members which may be extended and telescoped, and more particularly to such connections used with a tripod.

In the construction of tripods, particularly tripods for photographic use, it has long been desired to provide a relatively rigid yet lightweight tripod. In order to achieve light weight, tripods heretofore have had legs formed of light alloy or light metal tubes arranged so that they might be telescoped. In such structures, however, it has not been convenient to provide an arrangement whereby the legs might be adjusted so as to have different lengths to accommodate the tripod to uneven terrain. To correct for the non-horizontal position of the head of the tripod, it has been necessary to employ some adjustable device. Such adjustable device, however, again increased the carrying weight of the tripod, and hence constituted a disadvantage. It, therefore, would be desirable to provide an improved tripod with extensible legs which might be extended readily different amounts so that the tripod head might be held horizontal in spite of uneven ground surface or terrain, or the tripod head might be tilted to any desired angle by adjustment of the length of the legs of the tripod.

It, therefore, is an object of the present invention to provide an improved tripod having legs which can readily be adjusted to different lengths.

It is a further object of the present invention to provide an improved connection for coaxial members so as to readily permit the extension and collapse of such members.

It is a still further object of the present invention to provide an improved connection between coaxial members, such as the legs of a tripod, which may be extended to any desired position and which will automatically lock in such position.

A still further object of the present invention is to provide an improved connection between sections of coaxial members whereby a manual manipulation, without screw members, will permit the extended members to be contracted.

In accordance with the present invention, the improved form of tripod leg is obtained by providing a connection which automatically permits extension of the leg any desired amount and locks the extended leg in such position. A housing or sleeve containing such parts may be actuated axially to permit collapse of the leg for carrying a tripod.

Other and further objects of the invention subsequently will become apparent by reference to the following description taken in connection with the accompanying drawing wherein—

Figure 1 is a perspective view of a tripod constructed in accordance with the present invention;

Figure 2 is a cross-sectional view through one of the connectors in the legs of the tripod of Figure 1;

Figure 3 is a cross-sectional view as seen in the direction of the arrows along the line 3—3 of Figure 2;

Figure 4 is a cross-sectional view similar to Figure 2, illustrating the position of the parts when the cylindrical members are to be moved telescopically; and Figure 5 is an exploded view in perspective of the various parts of the connector and the associated cylindrical leg members.

Referring more particularly to Figure 1, there is shown a tripod having a head 10 to which is hingedly connected a plurality of legs. The construction of the tripod head 10 may be similar to constructions already used in other devices wherein each of the legs are arranged so as to limit the outward movement of the legs. Connected to the head 10 are the upper portions 12, 14 and 16 of a plurality of tripod legs. These upper leg portions 12, 14 and 16 are connected to lower leg portions 18, 20 and 22 by connectors 24, 26 or 28.

The connectors 28 are of a type which readily permit the extension or adjustment of the lower leg portions 18, 20 and 22 respectively, without manipulation of any adjusting or fastening devices. The connectors are so arranged that extensible movement of the legs may readily be obtained and any telescopic movement is automatically resisted. Thus if the lower leg portion is moved outwardly, the connector at once locks the leg into such extended relation.

Figure 2 shows one of the connectors 24 interconnecting the upper leg portion 12 and the lower leg portion 18. The connector 24 comprises a housing having a lower portion 30 and an upper portion 32. The upper portion 32 is provided with a reentrant portion 34 which, by any suitable arrangement, is relatively fixed with respect to the lower portion 30. This may be accomplished by the employment of threaded members, fastening pins, or a tight friction fit. The lower member 30 has an inner cylindrical recess 36 which contains a spring 38. The spring 38 engages the bottom of the recess 36 and a collar 40 secured to the upper end of the outer cylindrical member 18. While a separate collar 40 has been shown, it of course will be appreciated that the upper end of the rod 18 may be reversely turned or otherwise machined to provide a collar for engagement with the spring 38. The lower housing member 30 has adjacent its upper portion a cylindrical recess 42 of slightly greater diameter than the lower recess 36 so that a shoulder is formed at the juncture of the two recesses.

Mounted within the recesses 36 and 42 is a frusto-conical collet preferably formed of three similar members 44, 46 and 48. These members, when assembled, have a lower extremity 50 which is of frusto-conical or tapered shape and which extends into the upper portion of the outer cylindrical leg member 18. The outer cylindrical member 18 adjacent its upper end is provided with a complementary tapered portion 52. The three collet members 44, 46 and 48, when assembled, have a collar portion 54 at their upper extremity which is provided with a groove for receiving a retaining wire or ring 56. This retaining member is resilient so that the three collet parts are capable of radial movement.

The position of the parts shown in Figure 2 illustrates the manner in which the tapered collet locks the upper cylindrical leg member into position with respect to the lower cylindrical member 18 when the leg has been adjusted and the weight of the upper portion of the tripod rests upon the lower leg portions. The member 24, therefore, operates to resist telescopic movement of the leg members 12 and 18. If it is desired to further extend the legs by moving outwardly the lower leg portion 18, the collet may move upwardly until it engages the reentrant portion 34 of the upper housing member 32, thereby separating the conical lower surface of the collet from the conical surface at the upper end of the lower leg or cylindrical member 18. The resilient retaining member 56 thereafter permits sufficient separation of the inner cylindrical surface of the collet relative to the upper cylindrical leg member 12 so that this member may move slidingly relative to the collet.

If it is desired to collapse or shorten the legs, telescopic movement of the leg members may be obtained by grasping the housing of the member 24 and moving it upwardly relative to the lower leg portion 18. This action compresses the spring 38 so that the shoulder formed by the juncture of the recesses 36 and 42 engages the under side of the collar 54 of the collet. This raises the tapered portion of the collet from engagement with the tapered portion of the upper end of the lower leg member 18 so that the lower leg member 18 may be telescoped upwardly relative to the leg 12. As soon as the connection 24 is released, the spring 38 restores the parts to the position shown in Figure 2.

From the foregoing description of the operation, it will be understood that the housing comprising the lower portion 30 and the upper portion 32 is provided with suitable apertures having a sliding fit connection with the cylindrical members 18 and 12 respectively. While the upper cylindrical member 12 has been shown as being a hollow cylindrical member, in the small tripods it may be convenient to use a solid cylindrical member, particularly where such members are formed of lightweight alloys. It is, therefore, to be understood that the term "cylindrical member" is intended to cover both solid and hollow cylindrical members such as the rod and tube mentioned.

If it is further desired to provide for telescoping the tripod legs into a much shorter length than is possible by the use of a single connector in each leg, a plurality of connectors may be employed by adding another concentric cylindrical member.

While for the purpose of illustrating and describing the present invention a preferred embodiment has been shown in the drawing, it is to be understood that the disclosure is not deemed to be a limitation since such variations in the structure and in the arrangement of the component members is contemplated as may be commensurate with the spirit and scope of the invention set forth in the following claims.

The invention is hereby claimed as follows:

1. The combination comprising two coaxially arranged elongated cylindrical members interconnected by a connection, said connection comprising a slidably mounted housing, a multipart tapered gripping member slidably mounted on the inner cylindrical member and movable within said housing, means for causing said gripping member to resist telescopic movement of said cylindrical members, and manually operable means for moving said gripping member out of engagement with said latter means to permit telescopic movement of said cylindrical members.

2. The combination comprising two concentrically arranged cylindrical members connected by a slidably mounted housing having sliding fit openings therefor, an annular member surrounding the inner cylindrical member and movable relative to said member and said housing, said annular member having a frusto-conical portion, a complementary conical section on the inner wall and adjacent the upper end of the outer cylindrical member for cooperation with said frusto-conical portion of said annular member, the frusto-conical portion of said annular member normally being in engagement with the complementary conical section of said outer cylindrical member to resist telescopic movement of said members, means for biasing said housing to a predetermined position relative to the end of said outer cylindrical member, and shoulder means within said housing arranged upon manual operation thereof to move said annular member out of engagement with said outer cylindrical member for selective telescopic movement of said cylindrical members.

3. The combination comprising two concentrically arranged elongated cylinders and a connection therebetween normally permitting movement between the cylinders in one direction comprising a slidably mounted sleeve surrounding one end of said outer cylinder and said inner cylinder, a multipart conical collet member freely mounted on the inner cylinder within said sleeve, the inner wall of said outer cylinder terminating in a conical surface complementary to said conical collet member, said sleeve having an inner annular shoulder arranged for selective engagement with said conical collet member for unlatching said inner cylinder relative to said outer cylinder.

4. In a tripod having a head and a plurality of adjustable legs each having inner and outer coaxial cylindrical members, the combination comprising a slidably mounted housing having sliding fit openings therein for said members, said housing containing a frusto-conical multipart collar member slidably mounted on said inner cylindrical member and movable within said housing, said outer cylindrical member having its inner wall adjacent the end terminating in a conical surface complementary to a portion of said frusto-conical collar member, said collar member having a shoulder, said housing having an internal shoulder for selective engagement with the shoulder of said frusto-conical collar member for moving said member out of engagement with the complementary conical surface of said outer cylindrical member to permit selective movement of said cylindrical members to a collapsed position.

5. A tripod having a head connected to a plurality of legs formed of coaxially arranged tubes, a connection between said tubes comprising a slidably mounted housing having sliding fit openings therein for said tubes, an annular member slidably mounted on said smaller tube and movable within said housing, said annular member having a collar portion and a frusto-conical portion, said larger tube having adjacent its end an inner surface complementary to a portion of said frusto-conical portion, spring means normally biasing said housing to a certain position, said annular member biased by said housing normally engaging said inner surface of said larger tube and an adjacent portion of said smaller tube to resist telescoping or collapsing movement of said tubes, said housing having an internal shoulder normally biased away from the collar of said annular member but arranged for manual movement against the action of said spring means for positioning said annular member away from the inner end of said outer tube to permit said tubes to be moved to a collapsed position.

6. The combination of two cylinders adapted for telescopic movement relative to each other, the larger of said cylinders having a shoulder directed radially outward adjacent the end thereof, said larger cylinder having a tapered inner wall section adjacent said shoulder to provide an enlarged opening at said end, a sleeve member, said sleeve surrounding the end of said larger cylinder and the smaller cylinder, said sleeve member having internal shoulders at its end, a collet member having a collar portion and a frusto-conical portion slidably mounted on the smaller cylinder and movable within said sleeve, said collet adapted to enter the large opening at the end of said larger cylinder and to be urged into engagement with said smaller cylinder, a spring, said spring mounted on said larger cylinder adjacent said shoulder thereon, said spring adapted to engage one of said internal shoulders of said sleeve to urge said sleeve to a predetermined position relative to said larger cylinder, and means to engage the collar portion of said collet member for movement of said collet from engaged position to permit telescopic movement of said cylinders relative to each other.

HERMAN SCHULZ.

REFERENCES CITED

The following references are of record in the file of this patent:

UNITED STATES PATENTS

| Number | Name | Date |
|---|---|---|
| 836,303 | Christensen | Nov. 20, 1906 |
| 2,184,358 | Moore | Dec. 26, 1939 |
| 2,380,632 | Cousino | July 31, 1945 |

FOREIGN PATENTS

| Number | Country | Date |
|---|---|---|
| 24,155 | Great Britain | 1913 |
| 87,614 | Switzerland | Feb. 16, 1921 |